(12) United States Patent
Salter et al.

(10) Patent No.: US 9,902,314 B1
(45) Date of Patent: Feb. 27, 2018

(54) VEHICLE LIGHT SYSTEM

(71) Applicant: Ford Global Technologies, LLC, Dearborn, MI (US)

(72) Inventors: Stuart C. Salter, White Lake, MI (US); Paul Kenneth Dellock, Northville, MI (US); Benjamin Yilma, Canton, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/353,888

(22) Filed: Nov. 17, 2016

(51) Int. Cl.
*B60Q 1/26* (2006.01)
*B60Q 1/38* (2006.01)

(52) U.S. Cl.
CPC .............. *B60Q 1/268* (2013.01); *B60Q 1/38* (2013.01)

(58) Field of Classification Search
CPC ...... B60Q 1/268; B60Q 1/2696; B60Q 1/302; B60Q 1/38
USPC ........................................................ 362/503
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |
| 5,434,013 A | 7/1995 | Fernandez | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

A vehicle light system is provided herein. The light system includes a first light source disposed on a first side of a substrate. A second light source is disposed on a second side of the substrate. An overmold material is disposed on the first and second light sources. The overmold material has a reflective portion and a lens portion. An adhesive layer is configured to couple the overmold material to a vehicle window. The first light source emits light towards the reflective portion and the second light source emits light towards the window.

16 Claims, 10 Drawing Sheets

(56) References Cited

U.S. PATENT DOCUMENTS

| | | |
|---|---|---|
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,944,655 B2 | 2/2015 | Verrat-Debailleul et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,188,293 B1 | 11/2015 | Corporon et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formosa |
| 2003/0167668 A1 | 9/2003 | Fuks et al. |
| 2003/0179548 A1 | 9/2003 | Becker et al. |
| 2004/0156210 A1 | 8/2004 | Pederson |
| 2004/0208013 A1 | 10/2004 | Dalton, Jr. et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0138808 A1 | 5/2015 | Salter et al. |
| 2015/0267881 A1 | 9/2015 | Salter et al. |
| 2015/0353003 A1 | 12/2015 | Salter et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 202014104932 U1 | 3/2015 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

US 9,902,314 B1

VEHICLE LIGHT SYSTEM

FIELD OF THE INVENTION

The present disclosure generally relates to vehicle lighting systems, and more particularly, to vehicle lighting systems employing one or more luminescent structures.

BACKGROUND OF THE INVENTION

Illumination arising from the use of luminescent structures offers a unique and attractive viewing experience. It is therefore desired to implement such structures in automotive vehicles for various lighting applications.

SUMMARY OF THE INVENTION

According to one aspect of the present disclosure, a vehicle light system is disclosed. The light system includes a first light source disposed on a first side of a substrate. A second light source is disposed on a second side of the substrate. An overmold material is disposed on the first and second light sources. The overmold material has a reflective portion. An adhesive layer is configured to couple the overmold material to a vehicle window. The first light source emits light towards the reflective portion and the second light source emits light towards the window.

According to another aspect of the present disclosure, a light strip is disclosed. The light strip includes a substrate. A first light source is disposed on the substrate. An overmold material surrounds the light source. The overmold material includes a reflective portion. An adhesive layer is disposed between the overmold material and a window.

According to yet another aspect of the present disclosure, a light strip is disclosed. The light strip includes a substrate. A light source is disposed on the substrate. An overmold material surrounds the light source. The overmold material includes a lens portion. A luminescent structure is operably coupled with the light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
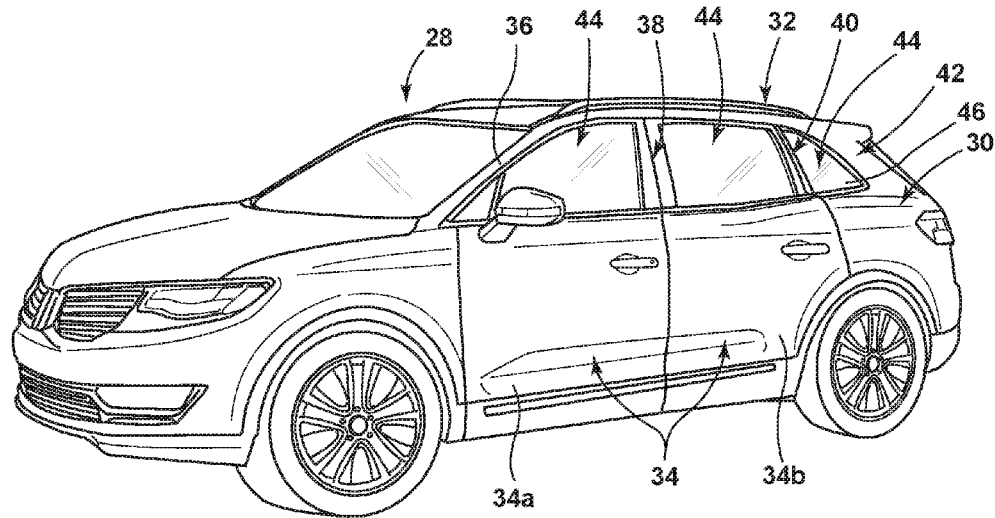
FIG. 2 is a side perspective view of a vehicle have a plurality of windows along the vehicle.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light system. The light system may advantageously employ one or more phosphorescent and/or luminescent structures to illuminate in response to predefined events. The one or more luminescent structures may be configured to convert ambient light and/or light received from an associated light source and re-emit the light at a different wavelength typically found in the visible spectrum.

Figure 1A:
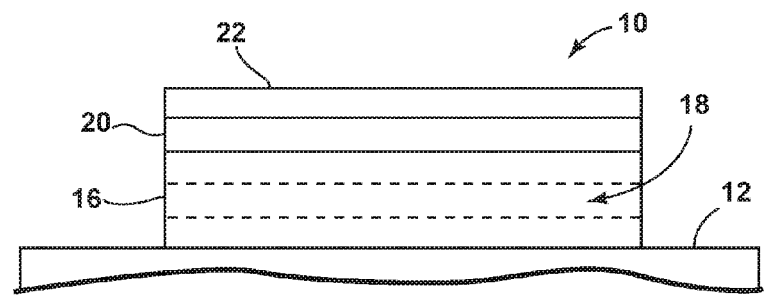
FIG. 1A is a side view of a luminescent structure rendered as a coating for use in a luminescent latch assembly, according to various embodiments.
Figure 1B:
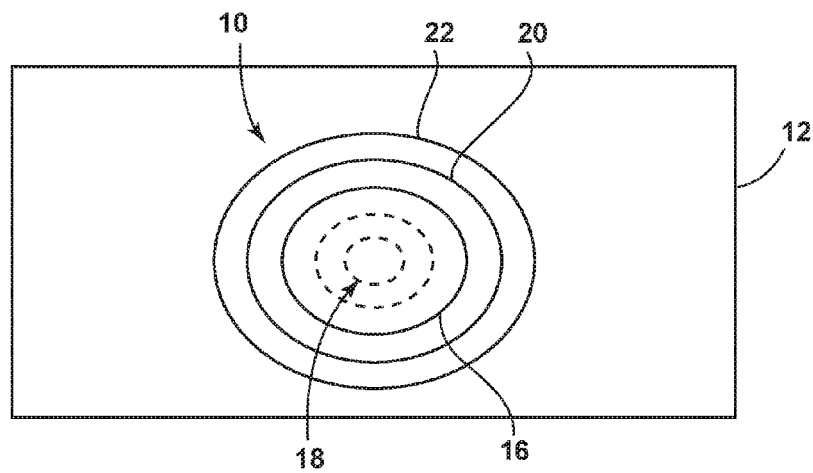
FIG. 1B is a top view of a luminescent structure rendered as a discrete particle, according to various embodiments.
Figure 1C:
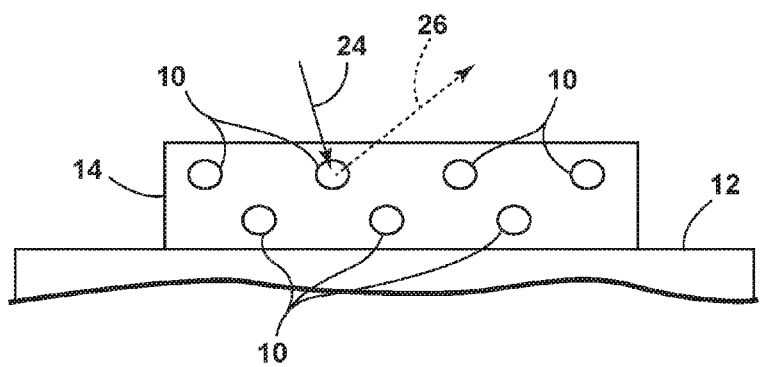
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown through broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 66 (FIG. 4) is referred to herein as excitation light 24 and is illustrated herein as solid arrows. In contrast, light emitted from the luminescent structure 10 is referred to herein as converted light 26 and is illustrated herein as broken arrows. The mixture of excitation light 24 and converted light 26 that may be emitted simultaneously is referred to herein as emitted light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat. No. 9,057,021 to Kingsley et al., and U.S. Pat. No. 8,846,184 to Agrawal et al., all of which are incorporated herein by reference in its entirety.

According to various embodiments, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to various embodiments, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in some embodiments, the rare earth aluminum garnet type Ce phosphor may serve as the luminescent material 18 with ultra-short-persistence characteristics, which can emit the converted light 26 by absorbing purple to blue excitation light 24 emitted from a light sources 66. According to various embodiments, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein. Additional information regarding the production of short-persistence luminescent materials is disclosed in U.S. Pat. No. 8,163,201 to Kingsley et al., the entire disclosure of which is incorporated herein by reference.

Additionally, or alternatively, the luminescent material 18, according to various embodiments, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light sources 66). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various embodiments, may be operable to emit light at or above an intensity of 0.32 mcd/$m^2$ after a period of 10 minutes. Additionally, the long-persistence luminescent material 18 may be operable to emit light above or at an intensity of 0.32 mcd/$m^2$ after a period of 30 minutes and, in some embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources 66 that emit the excitation light 24, including, but not limited to, natural light sources (e.g., the sun) and/or any artificial light sources 66. The periodic absorption of the excitation light 24 from any excitation source may provide for a substantially sustained charge of the long-persistence luminescent material 18 to provide for consistent passive illumination. In some embodiments, a light sensor may monitor the illumination intensity of the luminescent structure 10 and actuate an excitation source when the illumination intensity falls below 0.32 mcd/$m^2$, or any other predefined intensity level.

The long-persistence luminescent material 18 may correspond to alkaline earth aluminates and silicates, for example doped di-silicates, or any other compound that is capable of emitting light for a period of time once the excitation light 24 is no longer present. The long-persistence luminescent material 18 may be doped with one or more ions, which may correspond to rare earth elements, for example, $Eu^{2+}$, $Tb^{3+}$ and/or $Dy^3$. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various embodiments, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various embodiments, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

Referring to FIG. 2, a vehicle 28 includes a body 30 and a roof 32. The body 30 includes a plurality of doors 34. The doors 34 include a driver door 34a and a rear passenger door 34b. The vehicle 28 further includes an A-pillar 36, a B-pillar 38, a C-pillar 40, and a D-pillar 42 that support the roof 32. It will be appreciated, however, that the vehicle 28 may have any number of longitudinally disposed pillars 36, 38, 40, 42 without departing from the scope of the present disclosure.

The pillars 36, 38, 40, 42 are separated by the doors 34. Each of the doors 34 includes a window 44. The window 44 may be made of a glass or any other substantially transparent and/or translucent material. A plurality of quarter windows 46 may be disposed on the vehicle 28. For example, the quarter windows 46 may be proximate the C-pillar 40, positioned vehicle rearward of the passenger door 34b, and/or extend therefrom. Additionally, and/or alternatively, the quarter windows 46 may be proximate the A-pillar 36, disposed vehicle forward of the driver door 34a, and/or extend from the driver door 34a. The quarter windows 46 may be contact with the any of the pillars 36, 38, 40, 42 and/or positioned within the A-pillar 36, B-pillar 38, C-pillar 40 (i.e., as opera windows), etc. The quarter windows 46 may be stationary (e.g., permanently sealed) or openable.

Figure 3:
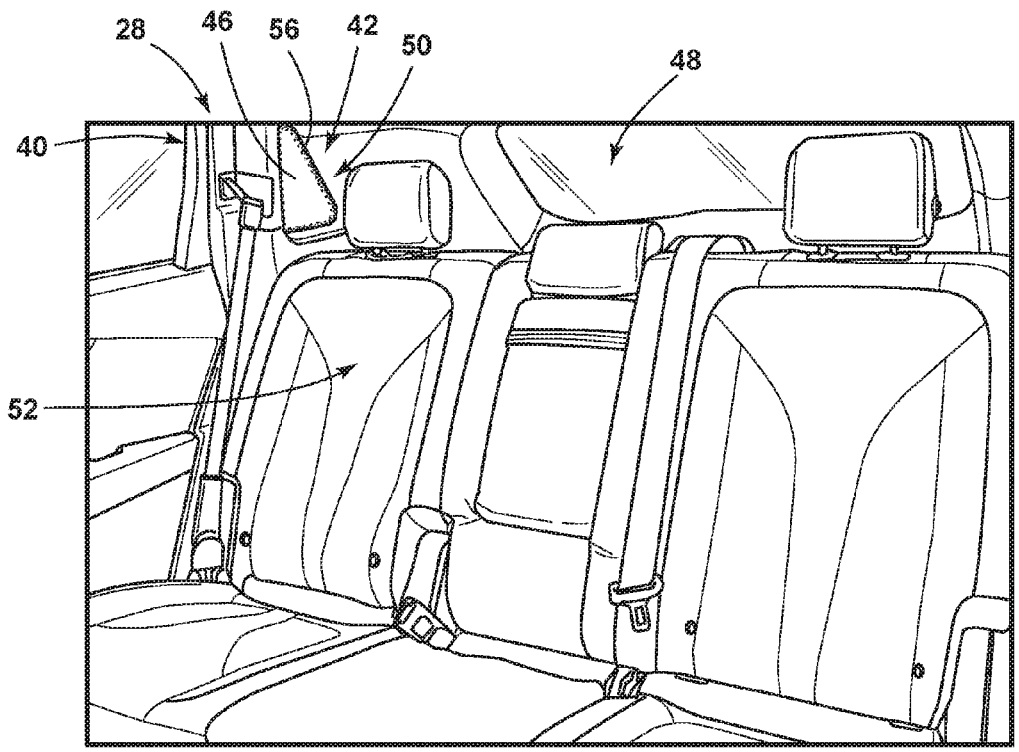
FIG. 3 is a side perspective view of a rear portion of a vehicle compartment illustrating a quarter window disposed rearwardly of a vehicle seat.
Figure 4:
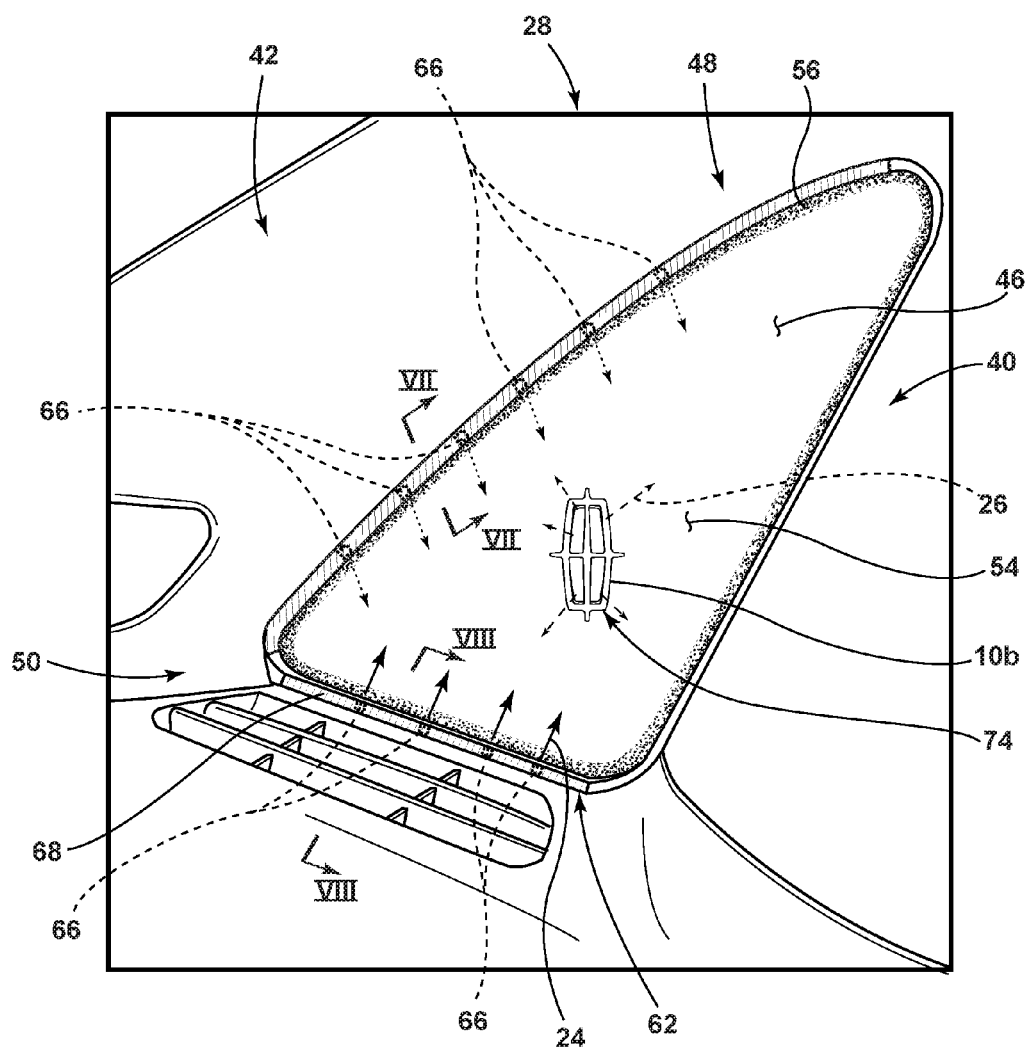
FIG. 4 is a perspective view of an interior surface of the quarter window having a light system that includes a plurality of light strips disposed along the window.

Referring to FIGS. 3 and 4, the quarter windows 46 is illustrated from within a vehicle compartment 48 that is defined by the body 30 (FIG. 2) and the roof 32 (FIG. 2). A rear trim component 50, and/or a plurality of rear trim components, is disposed behind a rear seat 52 of the vehicle 28. The rear trim component 50 partially frames the quarter windows 46 on an interior surface 54 of the quarter window 46 and/or may be in close proximity to the quarter windows 46.

A frit 56 may be used to block, partially or entirely, the passage of light through a portion of the quarter windows 46 or can impart a color to the glass pane for decorative, aesthetic or functional purposes. In various embodiments, the frit 56 may be conductive for it to be used in conjunction with a defroster or window-heating unit. The frit 56 may additionally and/or alternatively be used in vehicles 28 to protect the adhesive that bonds the glass to the vehicle 28 from the ultraviolet rays of the sun, to hide electrical wires and other hardware behind the glass, and also to provide a filter for the amount of sunlight allowed into the vehicle 28 such as "half tones" on the moon roof and certain backlights. Further purposes may include using the frit 56 to obscure a body opening, to block ultraviolet or infrared rays, as well as to provide graphic patterns to the vehicle 28.

Figure 5:
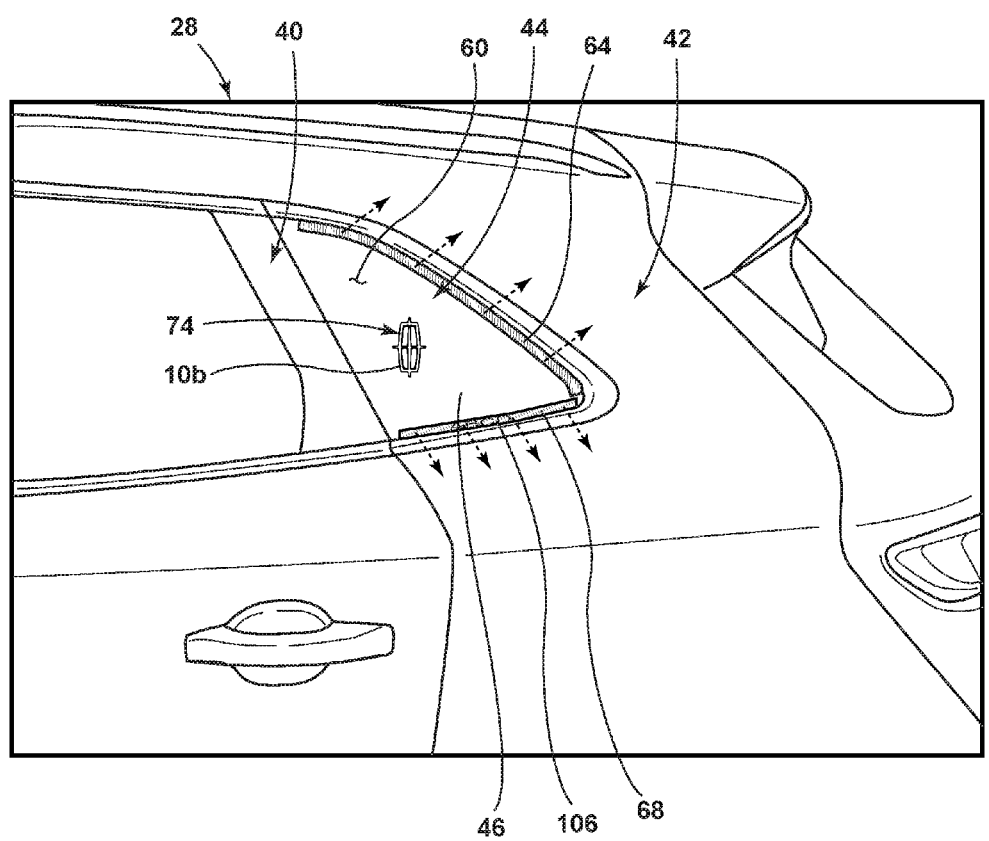
FIG. 5 is a perspective view of an exterior side of the quarter window having the plurality of light strips disposed along the window.

Referring to FIGS. 3-5, the quarter window 46 includes a window substrate 58 which defines the interior surface 54 and an outer surface 60. A light system 62 includes a first light strip 64. The first light strip 64 may be disposed along the interior surface 54 of the quarter windows 46, however, the light strip may be disposed on the exterior side in alternate embodiments. The first light strip 64 may include inboard and/or outboard light sources 66a, 66b disposed on two opposing sides thereof. The inboard light sources 66a may emit light towards the vehicle compartment 48 while the outboard light sources 66b may emit light towards the window substrate 58. According to various embodiments, the light emitted into the vehicle 28 from the inboard light sources 66a may be utilized as compartment ambient lighting, a dome light, feature lighting, and/or for any other function. The light emitted through the window substrate 58 may be used as a turn signal, a puddle lamp, ambient lighting, feature lighting, and/or for any other function. As used herein, the term "outboard" refers to any component that is directed towards the exterior of the vehicle 28. As used herein, the term "inboard" refers to any component that is directed towards the vehicle compartment 48 or any other portion of the interior of the vehicle 28.

The light system 62 may further include a second light strip 68 that is disposed along the quarter windows 46 and includes one or more light sources 66 that is orientated in one or more directions. According to various embodiments, the second light strip 68 may have a light source 66 that emits light along the quarter windows 46 from a first side 70 (FIG. 8) of the second light strip 68. A second side 72 (FIG. 8) of the second light strip 68 may include a first luminescent structure 10a thereon that is configured to luminesce in response to receiving excitation light 24 through the quarter windows 46. It will be appreciated that the light system 62 may include any number (one or more) of light strips 64, 68 that are disposed on any window 44 of the vehicle 28 without departing from the scope of the present disclosure.

The window 44 and/or the light strips 64, 68 may include indicia 74 therein and/or thereon. The indicia 74 may signify the make, model, or any other information that may be desirable to confer about the vehicle 28 to onlookers or occupants thereof. The indicia 74 may have a second luminescent structure 10b that is configured to luminesce in response to receiving excitation light 24 that may be emitted from the first and/or second light strip 64, 68. According to various embodiments, the indicia 74 may luminesce to indicate a company name and/or logo. For example, the indicia 74 may luminesce while the vehicle 28 is being used for commercial purposes. In some embodiments, the second luminescent structure 10b defines and/or is disposed within the indicia 74 and may include a long-persistence luminescent material 18 that may luminesce in response to receiving light from one or more light strips 64, 68 and/or natural light sources (i.e., the sun).

With respect to the embodiments described herein, the light sources 66 may each be configured to emit visible and/or non-visible light, such as blue light, UV light, infrared, and/or violet light and may include any form of light source. For example fluorescent lighting, light emitting diodes (LEDs), organic LEDs (OLEDs), polymer LEDs (PLEDs), laser diodes, quantum dot LEDs (QD-LEDs), solid-state lighting, a hybrid of these or any other similar device, or any other form of lighting. In response, the luminescent structure 10b (or any other luminescent structure 10a, 10c, 10d provided herein) may be configured to convert excitation light 24 received from the associated light source 66 into light having a wavelength in the visible spectrum.

According to some embodiments, the second luminescent structure 10b may be substantially non-visible when a corresponding excitation source is unilluminated, as shown in FIG. 3. When a corresponding light source 66 is illuminated, the second luminescent structure 10b may luminesce in response to receiving excitation light 24 from the light source 66, as shown in FIGS. 4 and 5. A wide range of luminescent materials 18 that luminesce in response to excitation light 24 and may be substantially non-visible in an unexcited state may be utilized without departing from the scope of the present disclosure. Upon illumination of an associated light source 66, the luminescent material 18 may luminesce in the visible portion of the light spectrum. Such a material may be disposed on an interior surface 54 of the quarter windows 46 through a wide range of processes. For example, the luminescent material 18 may be applied to the quarter windows 46 through painting, printing, spraying, slot coating, dip coating, roller coating, bar coating, or through the use of a film and adhesive. According to another embodiment, the second luminescent structure 10b may include a mixture of UV and/or IR excitable luminescent materials 18 therein.

Figure 6:
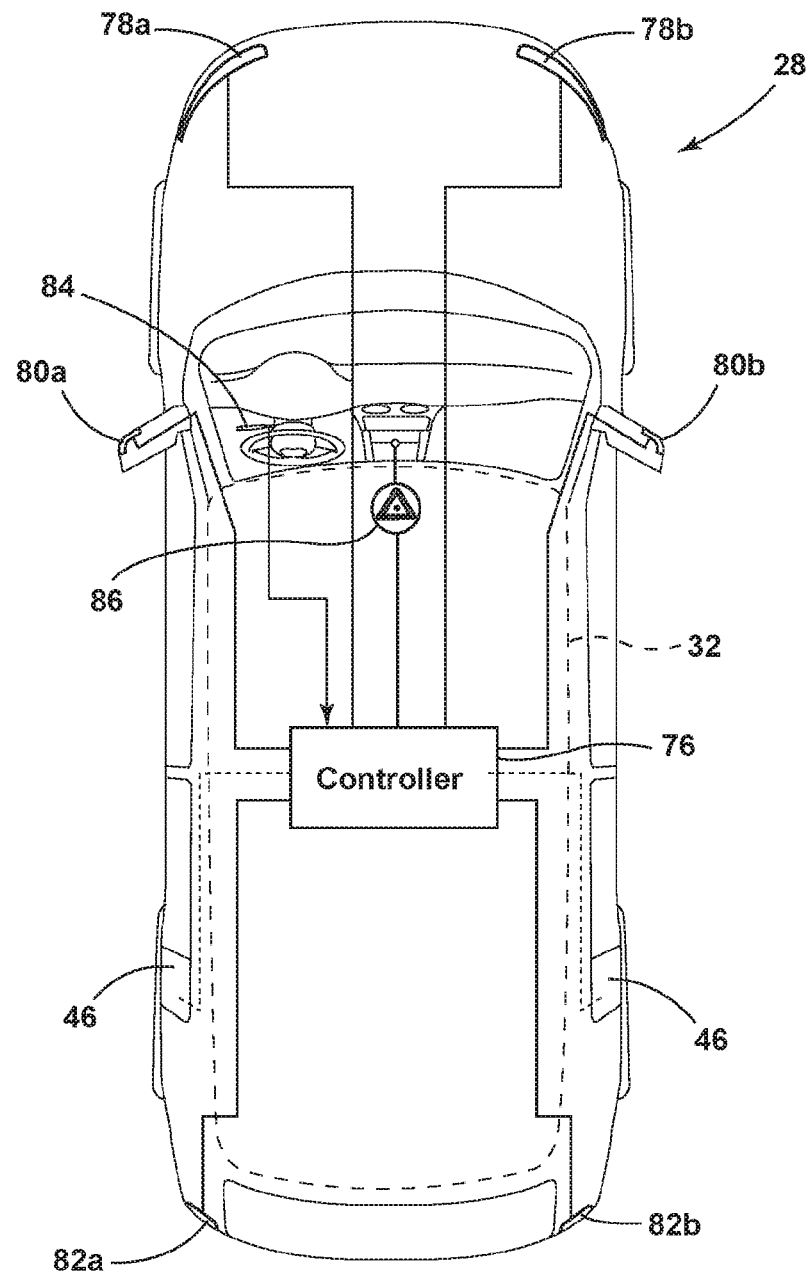
FIG. 6 is a top plan view of the vehicle having a controller that is operably coupled with lighting assemblies disposed within the vehicle.

Referring to FIG. 6, a controller 76 within the vehicle 28 communicates and/or controls other vehicle equipment including, but not limited to, headlights 78a, 78b, side mirror lights 80a, 80b, taillights 82a, 82b, a turn signaling device (e.g., turn signal lever 84), and/or hazard switch 86. In operation, the headlights 78a, 78b, side mirrors lights 80a, 80b, taillights 82a, 82b, and/or the light system 62 are actuated based on a vehicle status signal. For example, the controller 76 may generate a hazard signal when the hazard switch 86 is switched ON. In such an instance, the hazard signal may prompt headlights 78a, 78b, side mirror lights 80a, 80b, and taillights 82a, 82b to blink in unison. Additionally, the outboard light sources 66b of the first light strip 64 may notify approaching vehicles of the hazard signal. The illumination of the outboard light sources 66b may occur so long as the hazard switch 86 is switched to ON. Likewise, when the turn signal lever 84 is actuated, the headlights 78a, 78b, the side mirror lights 80a, 80b, the taillights 82a, 82b, the turn signaling device (e.g., turn signal lever 84), and/or the hazard switch 86 that correspond to a direction of the turn signal lever 84 are illuminated. In operation, the headlights 78a, 78b, side mirrors lights 80a, 80b, taillights 82a, 82b may illuminate. The light system 62 may also illuminate in conjunction with any of the other lighting assemblies on a corresponding side of the vehicle 28 to notify proximately disposed vehicles of an upcoming change in the vehicle's 28 direction.

Figure 7:
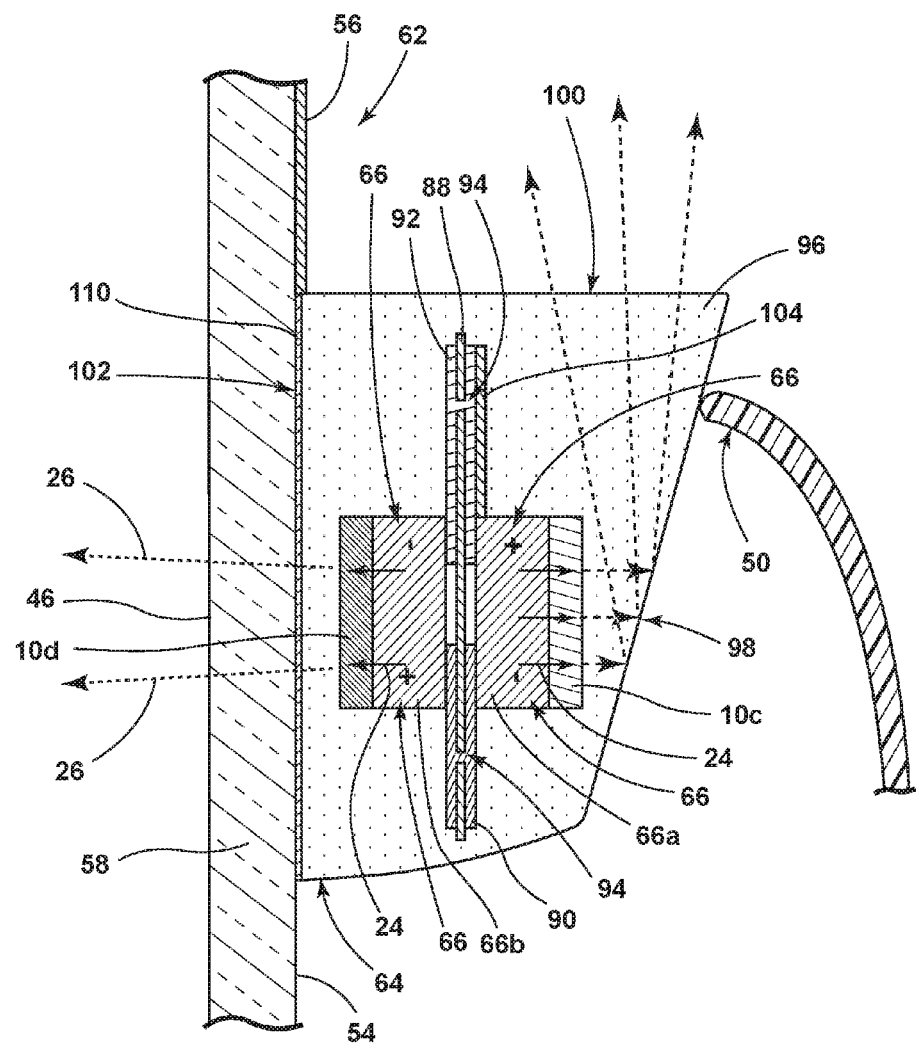
FIG. 7 is a side cross-sectional view of a first light strip taken along the line VII-VII of FIG. 4.

Referring to FIG. 7, in areas on the quarter windows 46 in which the one or more light strips 64, 68 are disposed, the quarter windows 46 may be free of the frit 56. In such instances, the frit 56 may still be disposed inwardly and/or outwardly of the first and/or second light strips 64, 68 along the quarter windows 46. However, the one or more light strips 64, 68 may be disposed on the frit 56 without departing from the scope of the present disclosure.

According to various embodiments, the light source(s) 66 may be deposited or printed on a substrate 88, such as a printed circuit board (PCB) containing control circuitry including light source drive circuitry for controlling activation and deactivation of the light source(s) 66. In one example, the printed light source(s) 66 may have largely-coplanar electrodes. The substrate 88 may be any type of circuit board including, but not limited to, any flexible and/or rigid circuit board. An example of light source(s) 66 that may be used with the technology described herein is described in U.S. Pat. No. 8,415,879 to Lowenthal et al., which is incorporated by reference herein.

In some embodiments, individual light source(s) 66 (e.g., LEDs) may be disposed (e.g., printed, laminated, captured) on the substrate 88 (e.g., a thin film having a thickness of less than 0.25 millimeters, a thin film having a thickness of 0.2 millimeters, a thin film having a thickness of 0.1 to 0.15 millimeters, a thin film having a thickness of 0.07 to 0.1 millimeters, a thin film having a thickness of 0.006 to 0.012 millimeters, a flexible thin film). In FIGS. 4 and 7-9, discrete units appear to be illustrated as light source(s) 66, however, it is contemplated that the light source(s) 66 may include tens, hundreds, and/or thousands of light source(s) 66.

In some embodiments, LEDs may be used as the individual light source(s) 66. In some examples, the LEDs have a diameter ranging from 10 to 50 microns and a height ranging from 5 and 20 microns. In one example, the LEDs have a maximum width or length, whichever is longer, ranging from about 300 to 320 microns. In some embodiments, the individual light source(s) 66 (e.g., LEDs) have a diameter ranging from about 20 to 30 microns and a height ranging from about 5 to 50 microns. In one example, the LEDs have dimensions of ranging from 230 to 300 microns on one side, 180 to 200 microns on a second side, and 50 to 80 microns in height. Therefore, measurements referencing a thickness with respect to a light source herein are within 80 microns of the distance stated since the thickness of the light source(s) 66 is determined by the thickness of the substrate 88 (where thickness of the light source(s) 66 is a measure of the height of the profile of the light source(s) 66 or, equivalently, a measure of the distance from the surface of the outermost layer of the substrate 88 to the side of the light source(s) 66 disposed away from the outermost layer of the substrate 88).

Furthermore, because the maximum width of unpackaged LEDs, which may be utilized as the light source(s) 66 of the currently described light system 62, is less than that of standard packaged LEDs, space between the centers of each LED may be reduced, which therefore increases the uniformity of the perceived light. In one example, the space between the centers of each unpackaged LED after being deposited is 0.05 millimeters. Since LEDs produce a "point" of light and because it is desirable in many applications to have uniform light (i.e., not being able to distinguish each point of light), as a rule of thumb, the diffusing offset distance (i.e., the minimum distance at which the light emitted from an LED array is perceived as uniform) may be approximately equal to the distance between the centers of adjacent LEDs. Therefore, for an LED light source 66, the diffusing offset distance may have a diffusing offset distance of approximately 0.05 millimeters.

Referring still to FIG. 7, the substrate 88 includes first and second conductive traces 90, 92 for powering the light source(s) 66. Any suitable type of technology can be utilized to implement the conductive traces 90, 92. The conductive traces 90, 92 may be composed of material that is reflective, opaque, or otherwise not translucent nor transparent. In some examples, the conductive traces 90, 92 may be translucent or transparent (e.g., by using indium tin oxide). The conductive traces 90, 92 may be created using conventional conductive ink or other similar processes. The conductive inks may be classed as fired high solids systems or PTF (polymer thick film) systems that allow circuits to be drawn or printed on a variety of substrate materials. These types of materials may contain conductive materials such as powdered or flaked silver and carbon-like materials. While conductive inks can be an economical way to deposit conductive traces 90, 92, traditional industrial standards such as etching of conductive traces 90, 92 may be used on relevant substrates 88. In yet another example, the conductive traces 90, 92 may be premade similarly to photo-etched copper and can have a secondary conductive bond material (e.g., solder) applied to the premade conductive traces 90, 92 to facilitate attachment.

It will be understood that the foregoing description of the light system 62 may include one or more light strips 64, 68 that incorporate a single continuous light source(s) 66 and/or a plurality of individual light source(s) 66. In examples where there are a plurality of light source(s) 66, some or all of the light source(s) 66 may be independently electrically connected (e.g., through a conductive ink). In independently electrically connected examples of the light source(s) 66, each of the light source(s) 66 may be independently addressable, which may allow the controller 76 to create static and dynamic patterns of light by independently illuminating certain light source(s) 66 and not others. In some instances, a machine may function to transfer unpackaged light source(s) 66 from a substrate such as a "wafer tape" to a product substrate, such as a circuit substrate. The direct transfer of unpackaged light source(s) 66 may reduce the thickness of an end product compared to a similar product produced by conventional means, as well as the amount of time and/or cost to manufacture the product substrate. Additional information on the formation of the plurality of light source(s) 66 and/or variously configured light-producing assemblies 78 is disclosed in U.S. Patent Publication No. 2015/0136573 to Peterson et al. and U.S. Patent Publication No. 2016/0276205 to Huska et al., both of which are incorporated herein by reference.

Referring again to FIG. 7, the first light strip 64 may include inboard and/or outboard light source(s) 66a, 66b disposed on opposing sides of the substrate 88. The conductive traces 90, 92 are disposed between each respective light source 66a, 66b and the substrate 88. In some embodiments, the conductive traces 90, 92 may be disposed through one or more apertures 94 in the substrate 88. Accordingly, the inboard and outboard light source(s) 66a, 66b may be conductively coupled with one another. Moreover, the poles of the inboard and outboard light source(s) 66a, 66b may be disposed in an opposing orientation so that each respective side of the first light strip 64 may be independently illuminated. At times when the inboard and outboard light source(s) 66a, 66b are to be illuminated contemporaneously, the controller 76 may provide power in an alternating fashion at a predefined frequency.

An overmold material 96 covers, and/or contacts, the substrate 88 and the light source(s) 66a, 66b. In some embodiments, the overmold material 96 is an electrically insulating material. The overmold material 96 may also be a thermally conductive thermoplastic material or a thermally conductive thermoset material that may have thermal conductivity values greater than about 1 W/m·K. If an electrically conducting material is used, then the conductive traces 90, 92, LED leads, any printed circuitry, and/or other exposed conductors are suitably coated with an insulative dielectric before disposing the overmold material 96 thereon.

The overmold material 96 may protect the light source(s) 66 and/or the substrate 88 from physical and chemical damage arising from environmental exposure. The overmold material 96 may have viscoelasticity (i.e., having both viscosity and elasticity), a low Young's modulus, and/or a high failure strain compared with the quarter windows 46 so that the overmold material 96 may protect the light source(s) 66 and/or the substrate 88 when contact is made thereto.

The overmold material 96 may continue to have flexible properties at low temperatures, such as temperatures below 0 degrees Celsius. In some embodiments, the overmold material 96 may further be resistant to UV light provided by natural light source(s) and substantially resistant to weathering. According to various embodiments, the overmold material 96 may be formed from a material containing silicone therein.

The overmold material 96 may also define the exterior geometry of each light strip 64, 68. Generally, each light strip 64, 68 may include a reflective portion 98 that may have a wide range of geometries based on the desired direction of the excitation light 24 and/or the converted light 26. The reflective portion 98 may be configured to refract (shift) and/or reflect the excitation light 24 and/or the converted light 26 to produce a desired pattern of the excitation light 24 and/or the converted light 26 distribution. It should be appreciated that each light strip 64, 68 may include one or more unique optics, or each optic within the light system 62 may have a substantially similar optical feature.

The overmold material 96 may also include an inboard lens portion 100 and/or an outboard lens portion 102. The excitation light 24 and/or the converted light 26 may exit the overmold through the inboard lens portion 100 and/or the outboard lens portion 102 in a desired direction. The lens portion 100, like the reflective portion 98, may be integrally formed when the overmold material 96 is disposed around the substrate 88 and/or light source(s) 66.

According to the embodiment illustrated in FIG. 7, a third luminescent structure 10c may be disposed on the inboard light source 66a. Similarly, a fourth luminescent structure 10d may be disposed on the outboard light source 66b. In operation, the light source(s) 66 may emit excitation light 24 thereby exciting any of the luminescent structures 10a, 10b, 10c, 10d. Alternatively, any type of light source 66, multicolored or unicolored, may be utilized to make the light system 62 illuminate in any desired color without the utilization of the luminescent structure 10a, 10b, 10c, 10d.

Figure 8:
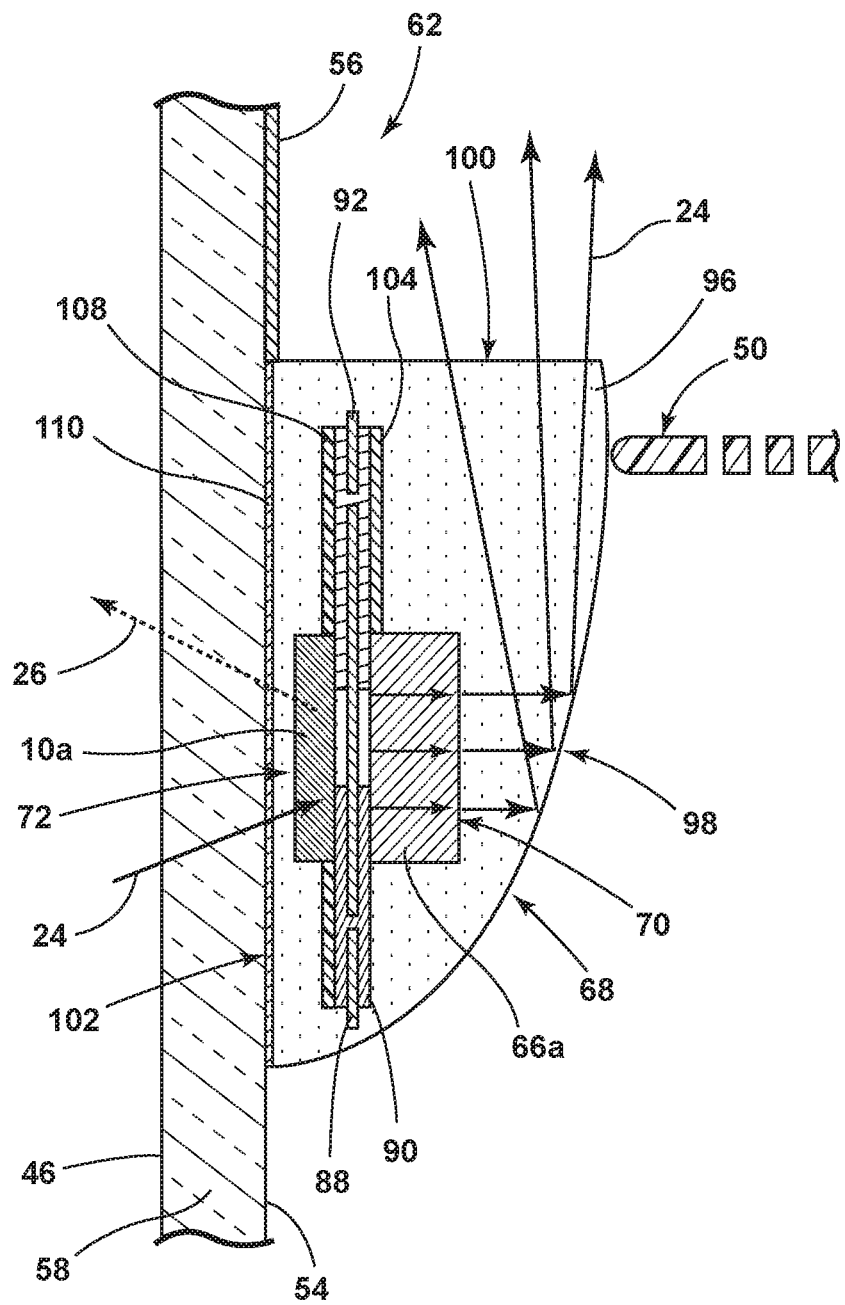
FIG. 8 is a side cross-sectional view of a second light strip taken along the line VIII-VIII of FIG. 4.

Referring to FIG. 8, the second light strip 68 includes one or more light source(s) 66 thereon that emit excitation light 24 along the quarter windows 46 and/or towards the indicia 106 (FIG. 5). The first luminescent structure 10a may also be disposed on the second light strip 68 and luminesce in response to receiving excitation light 24 through the quarter windows 46. The first luminescent structure 10a disposed on the light strip 68 may include indicia 106 therein that may be visible when the first luminescent structure 10a luminesces.

According to various embodiments, the luminescent structures 10a, 10b, 10c, 10d discussed herein are substantially Lambertian, that is, the apparent brightness of the luminescent structures 10a, 10b, 10c, 10d is substantially constant regardless of an observer's angle of view. As a consequence, the converted light 26 may be emitted outwardly from the luminescent structures 10a, 10b, 10c, 10d in numerous directions. With respect to the embodiment shown in FIGS. 7 and 8, a portion of the converted light 26 is redirected by the reflective portion 98 and exits through the inboard lens portion 100 of the overmold material 96. Another portion of the converted light 26 may be emitted into the interior of the overmold material 96 and become incident on a first solder mask 104 of the substrate 88. As a result, the converted light 26 may be redirected back toward the reflective portion 98 and transmitted through the inboard lens portion 100. In some embodiments, a second solder mask 108 may be disposed on an opposing side of the substrate 88. The first and second solder masks 104, 108 may be of differing colors. For example, the first solder mask 104 may be white and the second solder mask 108 may be black to conceal the light system 62 within the frit 56 surrounding the one or more light strips 64, 68.

The one or more light strips 64, 68 may be adhered to the quarter windows 46, or any other component of the vehicle 28, through an adhesive layer 110. The adhesive layer 110 may be an optically clear adhesive. As used herein, the term "optically clear" refers to an adhesive that may have a high light transmittance over at least a portion of the visible light spectrum (about 400 to about 700 nanometers), and that exhibits low haze. Both the luminous transmission and the haze can be determined using, for example, the method of ASTM-D 1003-95. In various embodiments, the adhesive has about 10% haze or less, particularly about 5% haze or less, and more particularly about 2% haze or less.

It will be appreciated that the light system 62 described herein may include any number of light strips 64, 68 having any orientation of light source(s) 66 without departing from the scope of the present disclosure. Moreover, the light strips 64, 68 may incorporate any number (zero, one, two, three, four, or more) of luminescent structures 10a, 10b, 10c, 10d without departing from the scope of the present disclosure. Accordingly, each luminescent structure 10a, 10b, 10c, 10d disclosed herein may be utilized independently and/or in conjunction with any other described luminescent structure 10a, 10b, 10c, 10d without departing from the teachings provided herein.

Figure 9:
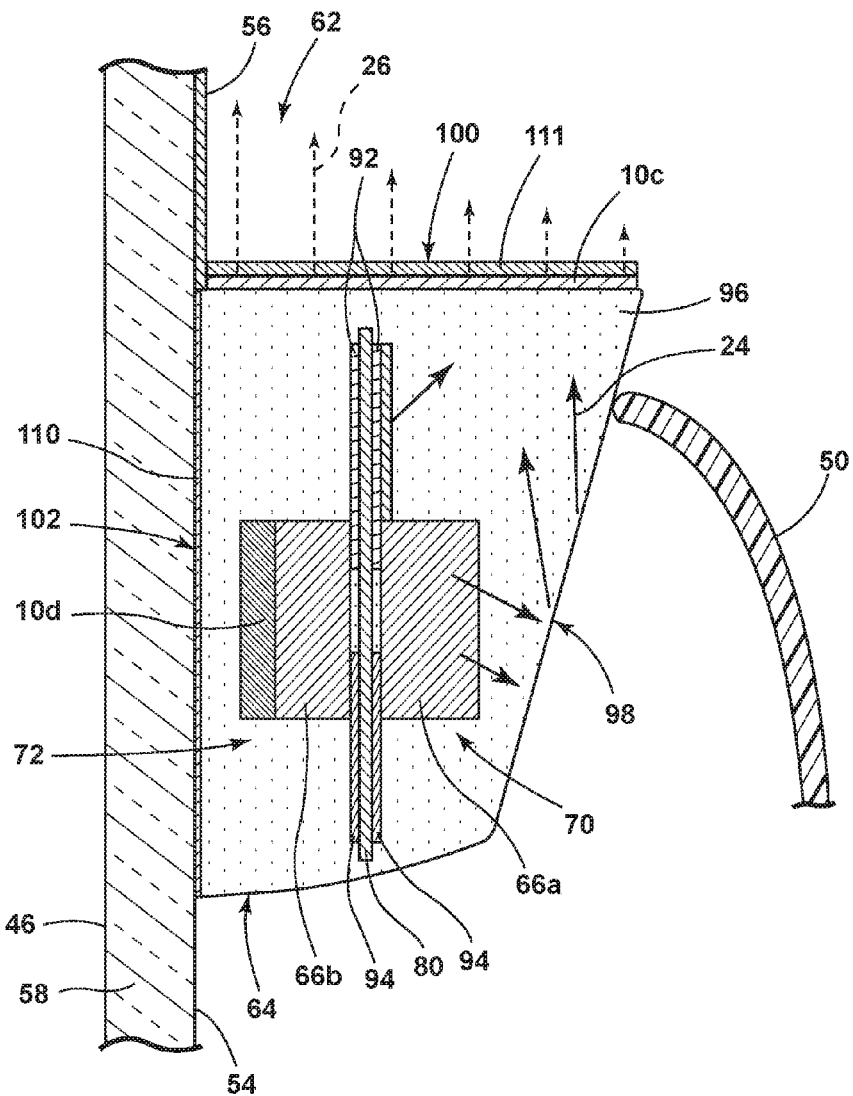
FIG. 9 is a side cross-sectional view of a first light strip, according to an alternate embodiment, taken along the line VII-VII of FIG. 4.

Referring to FIG. 9, the inboard and outboard light source(s) 66a, 66b may be coupled with independently disposed first and second conductive traces 90, 92. Accordingly, the inboard and outboard light source(s) 66a, 66b may be independently controlled by the controller 76.

As illustrated in FIG. 9, the third luminescent structure 10c may be disposed on the inboard lens portion 100 of the overmold material 96. Accordingly, the third luminescent structure 10c may luminesce in response to receiving excitation light 24 that have exited the overmold material 96. The third luminescent structure 10c may diffuse the excitation light 24 and/or luminesce in a uniform manner.

Portions of the light strips 64, 68 that are readily visible (e.g., the inboard lens portion 100, the outboard lens portion 102, and/or the third luminescent structure 10c) may be colored any color or may be metalized. For example, a decorative layer 111 may be applied to the lens portion of the light strip 64, 68 to match a color of the frit 56, the trim member, and/or any other proximately disposed component of the vehicle 28. According to an alternate embodiment, the decorative layer 111 may incorporate a metallic layer that may be applied to any portion of the one or more light strips 64, 68 via vacuum deposition and/or electroplating a thin layer of chromium thereon. Alternatively still, an imitator of chrome may be used for aesthetic purposes. The decorative layer 111 or some portion thereof may be transparent and/or translucent to allow light to pass therethrough.

Figure 10:
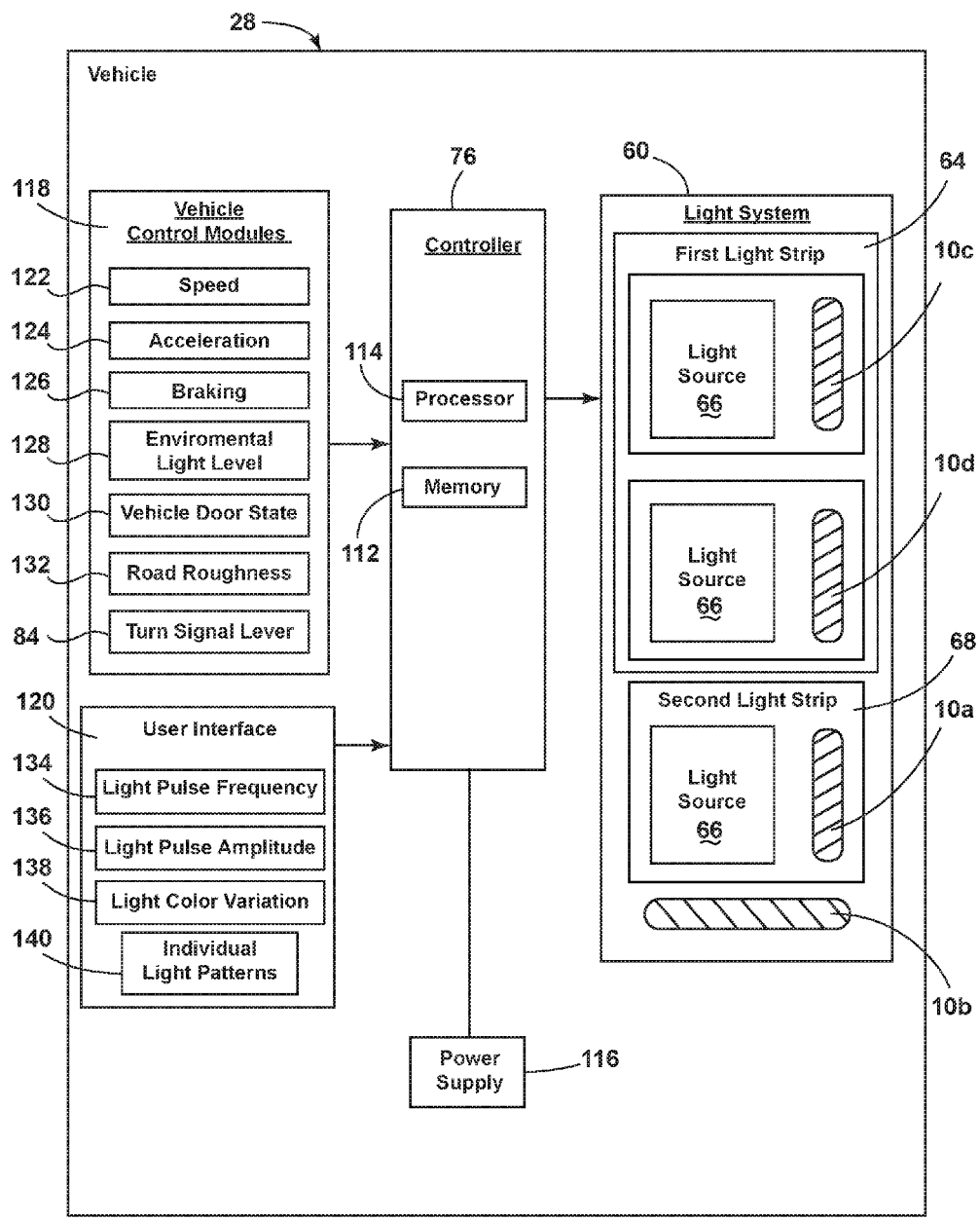
FIG. 10 is a block diagram showing the vehicle having the light system therein operably coupled with one or more controls within the vehicle.

Referring to FIG. 10, a block diagram of the vehicle 28 is generally shown in which the light system 62 is implemented. The vehicle 28 includes the controller 76 in communication with the light source(s) 66. The controller 76 may include memory 112 having instructions contained therein that are executed by a processor 114 of the controller 76. The controller 76 may provide electrical power to the light sources 66 via a power source 116 located onboard the vehicle 28. In addition, the controller 76 may be configured to control the excitation light 24 based on feedback received from one or more inputs.

The inputs that affect the illumination of the light system 62 may include information provided by vehicle control modules 118 and/or light system 62 illumination settings that may be inputted through a user interface 120. Vehicle control modules 118 such as, but not limited to, a body control module, engine control module, steering control module, brake control module, the like, or a combination thereof may also vary the colors of the light system 62. By controlling the excitation light 24 emitted from the light sources 66, the light system 62 may luminesce in a variety of colors and/or patterns to provide an aesthetic appearance, or may provide vehicle information to an intended observer. For example, the light system 62 may luminesce in various colors as the speed 122 and/or acceleration 124 of the vehicle 28 is varied. Also, the light system 62 may be utilized in conjunction with the vehicle braking system 126 to provide additional illumination during a braking period.

The environmental light level 128 outside the vehicle 28 may also affect the lighting of the light system 62. For example, the light system 62 may luminesce at a higher intensity during the day and a lower intensity during low light conditions. Moreover, the light system 62 may luminesce in response to a change in a vehicle door state 130, or any other change in relation to another component of the vehicle 28. Or, the light system 62 may vary in color with changes in environmental conditions, such as road roughness 132, potential hazards, variations in weather, or for any other reason. As described herein, the luminescent structures 10a, 10b, 10c, 10d may include a long-persistence luminescent material 18 such that environmental light (i.e., the sun) may excite the luminescent structures 10a, 10b, 10c, 10d during the day thereby causing the luminescent structures 10a, 10b, 10c, 10d to luminesce in low light conditions.

As discussed above, one or more of the light strips 64, 68 may illuminate in conjunction with a turn signal lever 84 disposed within the vehicle 28. The vehicle 28 may incorporate the one or more light strips 64, 68 on both lateral sides of the vehicle 28. The light strip 64, 68 on the lateral side of the vehicle 28 that corresponds with the turn signal lever 84 may illuminate and return to an unilluminated state when the turn signal lever 84 returns to a neutral position.

The vehicle 28 may also include a user interface 120 that an occupant may utilize for setting desired lighting effects of the light system 62. The user interface 120 may be an independent system, or integrated into any other system, such as a human machine interface (HMI), of the vehicle 28. The user interface 120 may be configured such that a user may control the wavelength of excitation light 24 that is emitted by the light sources 66 or a pattern of illumination. For example, an occupant may control the light pulse frequency 134, light pulse amplitude 136, light color variations 138, and/or individual light patterns 140 through usage of the user interface 120.

In operation, the light sources 66 may emit excitation light 24 of varying wavelengths, as provided herein. In response, the luminescent structures 10a, 10b, 10c, 10d may exhibit periodic unicolor or multicolor illumination. With respect to the above examples, the controller 76 may modify the intensity of the emitted wavelengths of excitation light 24 by pulse-width modulation or current control. In some embodiments, the controller 76 may be configured to adjust a color of the excitation light 24 by sending control signals to adjust an intensity or energy output level of the light sources 66. For example, if the light sources 66 are configured to output the first wavelength at a low level, substantially all of the first wavelength may be converted to the second wavelength by the one or more luminescent structures 10a, 10b, 10c, 10d. If the light sources 66 are configured to output the first wavelength (i.e., excitation light 24) at a high level, only a portion of the first wavelength may be converted to the second wavelength (i.e., converted light 26). In this configuration, a color of light corresponding to mixture of the first wavelength and the second wavelength may be output as the emitted light. In this way, the controller 76 may control an output color of the emitted light.

Though a low level and a high level of intensity are discussed in reference to the first wavelength of excitation light 24, it shall be understood that the intensity of the first wavelength of excitation light 24 may be varied among a variety of intensity levels to adjust a hue of the color corresponding to the emitted light from the light system 62. The variance in intensity may be manually altered, or automatically varied by the controller 76 based on predefined conditions.

As described herein, the color of the converted light 26 may be significantly dependent on the particular luminescent materials 18 utilized in the luminescent structures 10a, 10b, 10c, 10d. Additionally, a conversion capacity of the luminescent structures 10a, 10b, 10c, 10d may be significantly dependent on a concentration of the luminescent material 18 utilized in the luminescent structures 10a, 10b, 10c, 10d. By adjusting the range of intensities that may be output from the light sources 66, the concentration, types, and proportions of the luminescent materials 18 in the luminescent structures 10a, 10b, 10c, 10d discussed herein may be operable to generate a range of color hues of the emitted light by blending the first wavelength with the second wavelength.

A variety of advantages may be derived from the use of the present disclosure. For example, use of the disclosed light system provides a unique aesthetic appearance to the vehicle. Moreover, the light system may provide lighting to the occupants of the vehicle. The light system may also provide for exterior lighting while protected within the vehicle. The light system may be manufactured at low costs when compared to standard vehicle lighting assemblies.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle light system comprising:
a first light source disposed on a first side of a substrate;
a second light source disposed on a second side of the substrate;
an overmold material disposed on the first and second light sources, the overmold material having a reflective portion; and
an adhesive layer configured to couple the overmold material to a vehicle window, wherein the first light source emits light towards the reflective portion for an interior of the vehicle and the second light source emits light towards the window for an exterior of the vehicle.

2. The vehicle light system of claim 1, further comprising:
a first luminescent structure operably coupled with the first light source.

3. The vehicle light system of claim 2, further comprising:
a second luminescent structure operably coupled with the second light source.

4. The vehicle light system of claim 3, wherein the first and second light sources emit at least one of blue light, violet light, infrared and ultraviolet light.

5. The vehicle light system of claim 3, wherein the first luminescent structure and the second luminescent structure each include at least one luminescent material therein configured to convert an excitation light received from the first or second light source into a visible converted light.

6. The vehicle light system of claim 4, further comprising:
first and second conductive traces disposed on the substrate and configured to power the first and second light sources, wherein the first and second traces are disposed on both opposing sides of the substrate.

7. The vehicle light system of claim 6, wherein the substrate defines a first aperture through which the first conductive trace is disposed and a second aperture through which the second conductive trace is disposed.

8. A light strip comprising:
a substrate;
a first light source disposed on the substrate;
an overmold material surrounding the light source, wherein the overmold material includes a reflective portion;
an adhesive layer disposed between the overmold material and a window of a vehicle; and
a first luminescent structure separately disposed on the window and operably coupled with the first light source.

9. The light strip of claim 8, wherein the first luminescent structure defines indicia on the window.

10. The light strip of claim 8, wherein a second luminescent structure is in contact with the overmold material.

11. The light strip of claim 8, further comprising:
a second light source disposed on an opposing side of the substrate.

12. The light strip of claim 11, wherein the first light source is configured to illuminate a portion of a vehicle compartment and the second light source is configured to emit light towards the window.

13. The light strip of claim 8, wherein the second light source illuminates in conjunction with a vehicle turn signal lighting assembly.

14. A light strip comprising:
a light source disposed on a substrate;
an overmold material surrounding the light source and including a lens portion; and
a luminescent structure disposed on a vehicle window and operably coupled with the light source, wherein first and second solder masks are respectively disposed on first and second sides of the substrate, the first solder mask having a varied appearance from the second solder mask.

15. The light strip of claim 14, wherein an adhesive layer attaches the overmold material to a vehicle window and a frit is proximately disposed to the overmold material.

16. The light strip of claim 14, wherein the luminescent structure is disposed on an opposing side of the substrate from the light source.

* * * * *